United States Patent Office 3,790,480
Patented Feb. 5, 1974

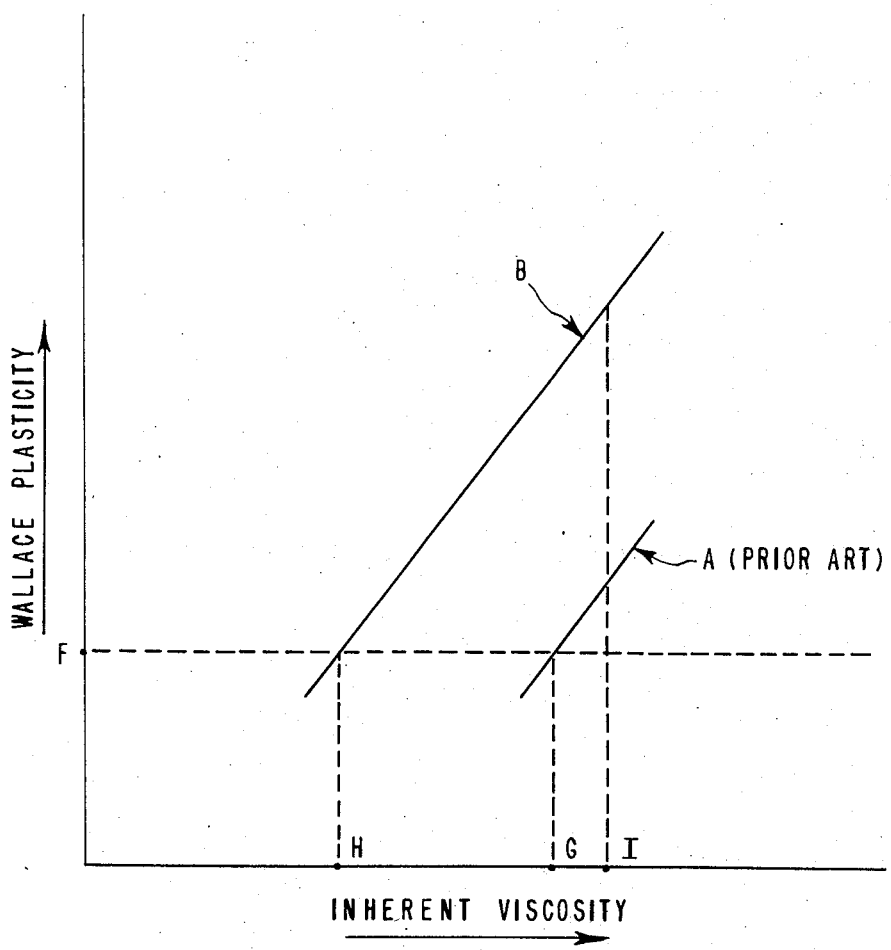
ETHYLENE COPOLYMERS
WALLACE PLASTICITY VS. INHERENT VISCOSITY

3,790,480
MINERAL OIL COMPOSITION
John B. Campbell, Hockessin, and Edward Fuller Cluff and Christos Sarafidis, Wilmington, Del., assignors to E. I. du Pont de Nemours and Company, Wilmington, Del.
Filed Dec. 29, 1972, Ser. No. 319,898
Int. Cl. C10m *1/18*
U.S. Cl. 252—59    10 Claims

ABSTRACT OF THE DISCLOSURE

A mineral oil composition comprising a neutral, non-volatile, mineral oil base and, as a viscosity index improver, an effective amount, for example, 0.5–3 weight percent, of an essentially amorphous, oil soluble copolymer having random repeat units derived, on a weight basis with the combined weights totalling 100%, (a) 25–55% from ethylene,
(b) 37–75% from a terminally unsaturated straight chain monoolefin having 3–12 carbon atoms,
(c) 0.1–10% from a non-conjugated diolefin having 5–18 carbon atoms and only one polymerizable double bond, and
(d) 0.1–2% from a non-conjugated diolefin having 5–18 carbon atoms and two polymerizable double bonds, said copolymer having an inherent viscosity of 0.7–1.8 as measured on a 0.1 weight percent solution in tetrachloroethylene at 30° C. and a Wallace Plasticity of at least 16, said copolymer further characterized as exhibiting superior processability and isolability and good shear stability.

BACKGROUND OF THE INVENTION

(1) Field of the invention

This invention relates to a mineral oil composition comprising a neutral, non-volatile mineral oil and an effective amount of a viscosity index improver.

(2) Description of the prior art

The property of viscosity is recognized as the most important single consideration in the selection of lubricating oils for automotive use. Interrelated with viscosity is that characteristic of a liquid which relates the shearing stress to the velocity gradient across a liquid film and the shearing stress produced in dragging the liquid along a faster moving surface. This tendency of a liquid oil to be dragged along by a moving surface makes it possible to form oil films which are capable of supporting loads and preventing metal-to-metal contacts, thus providing lubrication. All lubricants, including mineral lubricating oils, change in viscosity with a change in temperature in such a way that lubricating oils which are of sufficiently low viscosity to provide lubrication at low temperatures become thin at elevated temperatures (thus impairing lubrication), or conversely, when the oil viscosity is such as to provide adequate lubrication at elevated temperatures, it becomes so high with decreasing temperature that cold temperature engine starting and/or lubrication becomes difficult. Ideally, lubricating oils should have viscosities which are independent of the temperature, that is, the viscosity should be the same at all temperatures. The viscosity-temperature relationship of a lubricating oil in the temperature range of 110–210° F. is known as its viscosity index. An oil of high viscosity index undergoes less change in viscosity with change in temperature than an oil of low viscosity index. The viscosity index of the base lubricating oil depends primarily on the nature or composition of the oil. The viscosity and the viscosity index of an oil can be increased by incorporating into the base oil polymeric materials which are known as viscosity index improvers. Viscosity index improvers which have been used in the lubricating oil industry include polyisobutylene, polyacrylates and copolymers of ethylene and other hydrocarbon olefins. Representative of prior art on olefin copolymers are U.S. Pats. 3,522,180; 3,551,336; 3,598,738; and 3,691,078.

To be commercially useful, a viscosity index improver must possess properties other than those directly related to its use as a viscosity index improver. One such property is thickening ability which determines the amount of the additive required to give the desired viscosity at 210° F. Since the cost of the polymeric additive is considerably greater than the cost of the base oil, it is desirable that a minimum amount of the additive be used. Since thickening ability of the polymer is dependent upon its molecular weight, a smaller quantity of higher molecular weight polymer is required to give a desired thickening than a lower molecular weight material of the same type. However, a high molecular weight polymer generally exhibits the adverse effect of unduly thickening the oil at low temperatures, thus undesirably affecting the low temperature properties of the oil, for example, pour point and engine cranking performance. Another property which is required of a viscosity index improver is shear stability. Since the lubricating oil is subjected to shearing stresses during use, the added polymeric viscosity index improver may be broken down into lower molecular weight fragments and, in an extreme case, the viscosity contribution of the added polymer may be completely destroyed; such a shear-degraded oil blend can no longer provide adequate lubrication, especially at elevated temperatures. Shear stability is particularly important in multi-graded lubricating oils wherein the base oil is so chosen to provide sufficiently low viscosity at low temperatures and the viscosity at the elevated temperature is highly dependent upon the contribution to viscosity made by the polymeric viscosity index improver. The rate and the amount of shear degradation that a polymer undergoes under shearing stress is dependent upon the molecular weight of the polymer. For example, a lower molecular weight polymer will undergo less shear degradation than a higher molecular weight analog which is subjected to the same shearing stress; thus, an oil blend containing a lower molecular weight polymer will be more shear stable than a blend containing a polymer of higher molecular weight. In practice, the molecular weight range for the polymer used as a viscosity index improver is so chosen that it is a compromise which provides a maximum in thickening effect at elevated temperatures and a minimum in shear degradation.

In order for the ethylene copolymers which are suggested in the art as viscosity index improvers for mineral oil to impart the optimum properties to the oil blends with respect to thickening, low temperature properties and shear stability, the copolymer should have a weight average molecular weight of about 40,000–130,000. Although such molecular weights can be determined by conventional methods well known in the art, such as by light scattering, it is generally more convenient to characterize the molecular weight in terms of the inherent viscosity.

Prior art ethylene copolymers having molecular weights in the range of about 40,000–130,000, providing the best compromise of thickening effects, low temperature properties and shear stability, are difficult to process, isolate and handle. For example, such copolymers are prepared by techniques which utilize inert solvents. Steam distillation generally is used to remove the solvent from the copolymer, after which the copolymer generally is recovered as "whales" (that is, large masses of sticky balls) which are vitually impossible to handle when the molecular weight of the copolymer is less than about 100,000. In the case of copolymers with molecular weights in the 100,000–120,000 range, isolation by steam distillation is possible but extremely troublesome. In order to overcome these difficulties, the prior art copolymers which are useful as viscosity index improvers in mineral oils generally are produced by either of the following techniques. One alternative is to synthesize the ethylene copolymer so that it has a molecular weight of about 40,000–130,000 and, upon completion of the copolymerization reaction, to separate the solvent from the copolymer by distillation. The residual copolymer can be dissolved in a neutral mineral oil to produce an oil concentrate. This alternative is costly since (1) the distillation of the solvent from the copolymer solution is slow, particularly toward the end of the distillation when viscous solutions are produced, and (2) handling, transporting and storing of the copolymer as an oil concentrate is more expensive than handling, transporting and storing the isolated copolymer. The second alternative is to synthesize an ethylene copolymer of sufficiently high molecular weight, for example, so as to have an inherent viscosity of 1.8–3.0, so that it is readily isolable by steam distillation without the formation of "whales," and then degrade the copolymer to the desired molecular weight. This two step synthesis obviously is more costly than a process whereby the copolymer, of satisfactory processability, is produced directly.

From the above discussion it can be seen that it is highly desirable to provide ethylene copolymers which can be synthesized in conventional equipment, which can be readily isolated and which, without additional processing, have inherent viscosities suitable for use directly as viscosity index improvers for lubricating oils.

SUMMARY OF THE INVENTION

It is an object of this invention to provide a mineral oil composition having a good viscosity index and good shear stability. It is the further object to provide an oil composition which contains as a viscosity improver an ethylene copolymer which is readily processable. In summary, the present invention resides in a mineral oil composition comprising a neutral, non-volatile, mineral oil base and, as a viscosity index improver, an effective amount of an essentially amorphous, oil soluble copolymer having random repeat units derived, on a weight basis with the combined weights totaling 100%, (a) 25–55% from ethylene,
(b) 37–75% from a terminally unsaturated straight chain monoolefin having 3–12 carbon atoms,
(c) 0.1–10% from a non-conjugated diolefin having 5–18 carbon atoms and only one polymerizable double bond, and
(d) 0.1–2% from a non-conjugated diolefin having 5–18 carbon atoms and two polymerizable double bonds, said copolymer having an inherent viscosity of 0.7–1.8 as measured on a 0.1 weight percent solution in tetrachloroethylene at 30° C. (the method referred to throughout this disclosure and claims) and a Wallace Plasticity of at least 16. Such an inherent viscosity corresponds to a weight average molecular weight of about 40,000–130,000.

BRIEF DESCRIPTION OF THE DRAWING

The figure is a graphical representation of Wallace Plasticity vs. inherent viscosity for copolymers which are useful herein as a viscosity index improver for mineral oils and similar prior art copolymers which are not as widely useful.

DETAILED DESCRIPTION OF THE INVENTION

The present invention resides in the discovery that certain ethylene copolymers derived from four comonomers, and are thus tetrapolymers, have outstanding overall properties as viscosity index improvers for mineral oils and possess polymer bulk properties which are advantageous in the processing, isolating and handling thereof. The oil composition of this invention and containing such a tetrapolymer is as defined above. Preferred oil compositions include those containing 0.5–3 weight percent and 5–15 weight percent of the tetrapolymer, the latter providing an oil concentrate which can be diluted with neutral mineral oil base to achieve the desired use concentration of tetrapolymer. Preferred oil compositions also include those containing 1–2 weight percent of tetrapolymer which is derived (a) 47.3–54.7% from ethylene,
(b) 42–48% from propylene,
(c) 3–4% from 1,4-hexadiene, and
(d) 0.3–0.7% from 2,5-norbornadiene, and has an inherent viscosity of 1.1–1.7. Such an inherent viscosity corresponds to a weight average molecular weight of about 70,000–120,000.

Methods for preparing amorphous, oil soluble, ethylene copolymers are well known in the art. "Linear and Stereoregular Additional Polymers," Gaylord and Mark, Interscience Publishers, New York, N.Y., 1959, U.S. Pat. 3,598,738 and Canadian Pat. 855,774 are representative of such art. In the preparation of such copolymers hydrocarbon soluble vanadium compounds are advantageously used. Useful soluble vanadium compounds include vanadium oxytrichloride, vanadium tetrachloride and vanadium trisacetylacetonate. The vanadium compound is used in conjunction with an organoaluminum compound, such as an aluminum alkyl or alkylaluminum halide, to produce the polymerization catalyst. At least one of the catalyst components should contain halogen. The particular catalyst system used is critical to the present invention only to the extent that it must be capable of forming amorphous, oil soluble, ethylene copolymers. Although the amorphous nature of the copolymer can be determined by X-ray examination, such an evaluation is not sensitive at very low levels of crystallinity. The amorphous nature of the copolymer can best be observed by determining whether or not it is soluble in the oil. By oil soluble is meant that the copolymer dissolves in the neutral, non-volatile, mineral oil base at 170–210° F. and remains dissolved therein at ambient temperatures.

Lubricating oils generally contain polymeric pour point depressants to improve low temperature pour properties. In order to assure no adverse interaction with such additives the tetrapolymers used herein must not contain more than 55 weight percent polymer repeat units derived from ethylene. Since ethylene is the least expensive comonomer used in preparing the tetrapolymer, the ethylene content of the polymer should be as high as possible (up to 55%) and at least 25 weight percent. An especially preferred ethylene content is 47.3–54.7 weight percent.

The second monomeric unit of the copolymer used in the oil composition of the present invention is derived from a terminally unsaturated straight chain monoolefin of 3–12 carbon atoms. Suitable terminally unsaturated monoolefins, also called α-olefins, include propylene, 1-butene, 1-pentene, 1-hexene, 1-heptene, 1-octene, 1-nonene, 1-decene and 1-dodecene. Because of its low cost and availability, the preferred monoolefin is propylene and the preferred content of propylene polymer repeat units in the copolymer is 42–48 weight percent.

0.1–10 weight percent of the copolymer is derived from a non-conjugated diolefin having 5–18 carbon atoms and one polymerizable double bond. Polymerizable double bonds in the well known coordination polymerization systems used to prepare the copolymers herein are generally unhindered terminal bonds in aliphatic diolefins or double bonds in strained ring cycloaliphatic compounds, such as cycloaliphatic compounds having one or two carbon atom bridged ring structures. Double bonds which are not readily polymerizable are internal double bonds (that is, non-terminal double bonds), sterically hindered double bonds of aliphatic olefins, such as olefins carrying an alkyl substituent on one of the carbon atoms of the double bond, and double bonds in relatively unstrained cycloaliphatic rings. Representative non-conjugated diolefins containing one polymerizable double bond include 1,4-hexadiene, 1,4-heptadiene, 1,5-heptadiene, 2-methyl-1,5-hexadiene, 1,4-octadiene, 1,5-octadiene, 1,6-octadiene, 2-methyl-1,6-heptadiene, 2-methyl - 1,7 - octadiene, 1,9-octadecadiene, dicyclopentadiene, tricyclopentadiene, 5-methylene-2-norbornene, 5-(1'-propenyl) - 2 - norbornene, 5-ethylidene - 2 - norbornene and 5-(2'-butenyl)-2-norbornene. The perferred diolefin with one polymerizable double bond is 1,4-hexadiene and the preferred content of the copolymer repeat units derived therefrom is 3–4 weight percent.

The fourth monomeric unit of the copolymer used in the oil composition of this invention is derived from a non-conjugated diolefin having 5–18 carbon atoms and two polymerizable double bonds, as defined above. Suitable diolefins containing two polymerizable double bonds include 1,4-pentadiene, 1,5-hexadiene, 1,6-heptadiene, 1,7-octadiene, 1,9-decadiene, 1,17-octadecadiene, 5-(5'-hexenyl)-2-norbornene, 5-(2'-propenyl)-2-norbornene, 2,5-norbornadiene and the reaction product of 2,5-norbornadiene and cyclopentadiene (1,4,4a,8,8a - hexahydro-1,4,5,8-oxo-endo-dimethanonaphthalene and referred to herein as norborneonorbornene). The diolefin containing two polymerizable double bonds is used in such amount as to provide 0.1–2 weight percent of the total weight of copolymer repeat units. Copolymer containing less than 0.1% of the diolefin copolymer repeat units does not provide sufficient processability advantage over a copolymer lacking such a diolefin component, whereas if the diolefin component is present in excess of about 2%, the solubility of the copolymer in oil is impaired. The preferred diolefin with two double bonds is 2,5-norbornadiene and the preferred content of the copolymer repeat units derived therefrom is 0.3–0.7 weight percent. The content of the repeat units derived from the fourth comonomer, that is, the diolefin having two polymerizable double bonds, can be determined from the difference in the amounts of this comonomer present before and after the copolymerization has been carried out. The incorporation of small quantities of this fourth comonomer into the copolymer provides a great increase in the bulk copolymer viscosity with only a slight change in inherent viscosity.

The processability of polymers, including the ease of isolation from the polymerization reaction mixture, is related to bulk polymer properties, particularly viscosity. Generally, the bulk polymer viscosity of a given polymer is directly proportional to the molecular weight. Ethylene copolymers of low bulk polymer viscosities are characterized by high tackiness and high polymer flow under load. Bulk polymer viscosities are conveniently measured by well known procedures using a parallel plate plastometer, such as the Wallace Plastometer. For the determination of Wallace Plasticity, a sample is sheeted and cut into pellets having a thickness in the range of 3.18–6.35 mm. During a 10 second period the pellet is simultaneously compressed to 1.0 mm. in thickness and heated to 100° C.; the resulting piece is then subjected to a 10 kg. load for 15 seconds at 100° C. The final thickness of the test piece, expressed in units of 0.01 mm., is the plasticity value recorded. Proper platen temperature on the press is very important since plasticity is usually temperature dependent. From a practical standpoint, ethylene copolymers whose Wallace Plasticity values are less than about 16 offer great difficulties in processing, such polymers being characterized as being very sticky and exhibiting excessive cold flow.

The ethylene copolymers which are useful herein have sufficiently high bulk polymer viscosities to provide ease of processing, but their solution viscosities are such that they are suitable for use as viscosity index improvers for mineral oils. In other words, the bulk polymer viscosity properties possessed by the copolymers which are useful herein are characteristic of copolymers whose molecular weights are above the range generally considered necessary to impart suitable low temperature properties and shear stability to mineral oil blends.

The above discussion of the unexpected advantages which are achieved by means of the ethylene copolymers which are useful in this invention may be made clearer by reference to the figure which is a graphical representation of the relationship between Wallace Plasticity and inherent viscosity for copolymers which are useful herein and copolymers which are representative of the prior art and not as useful. The graphs represent copolymers more fully described hereinafter and shown in Table 1, and more specifically, B represents tetrapolymers which are useful in the oil composition of this invention and A represents prior art terpolymers. Point F represents the Wallace Plasticity value below which copolymer processability is unduly difficult and Point I represents the inherent viscosity value above which the copolymer becomes unsuitable for use as a viscosity index improver because of the poor low temperature properties an poor shear stability which it imparts to the oil with which it is blended. It can be seen that tetrapolymers represented by B exhibit plasticity values which are above Point F at lower values of inherent viscosity than terpolymers represented by A; thus, tetrapolymers are processable at lower inherent viscosities than terpolymers; conversely, the minimum inherent viscosity of terpolymers which can be processed is represented by Point G whereas with tetrapolymers, a polymer of much lower inherent viscosity, represented by Point H, can be processed. The distance between the lines A and B depends upon the amount of diolefin with two polymerizable double bonds incorporated into the tetrapolymer. Finally, the figure clearly shows the much broader range of inherent viscosity values and, therefore, the much broader range of tetrapolymers from which a selection can be made (as opposed to the similar prior art terpolymers) in formulating the oil composition of this invention.

The neutral mineral oil which is used as the base oil of the composition of this invention can be a lubricating oil, such as a crankcase oil, or a functional fluid, such as an automatic transmission fluid or an hydraulic fluid. Neutral mineral oils are generally non-volatile mineral oils which have been refined, generally by solvent extraction, to remove acidic and alkaline components. Lubricating oils and transmission fluid base oils are generally preponderantly paraffinic, solvent refined neutral oils having Saybolt Universal Second (S.U.S.) viscosities of about 60–220 at 100° F. and viscosity indices of about 80–110. Lubricating oils generally have viscosities of about 90–160 at 100° F. and transmission fluids have viscosities of about 60–110 at 100° F. Hydraulic fluid base oils are generally preponderantly naphthenic, solvent refined, neutral oils having S.U.S. viscosities of not greater than about 50 at 100° F. and pour points of less than about −65° F.

The ethylene copolymers which are useful in this invention can be incorporated into the neutral base oil in any convenient manner. The copolymer can be added and the dissolution facilitated by stirring, with heating if desired. More conveniently, the copolymer can be milled or blended into a small portion of the oil to form a concentrate which can subsequently be blended with additional oil to the desired use concentration. Especially suitable oils for the preparation of the concentrates are those having S.U.S. viscosities of 70–150 at 100° F. The polymer concentrates can conveniently contain about 5-15 weight percent of the copolymer.

The oil composition of this invention can also contain other types of additives normally compounded into mineral oil compositions.

The following general procedure was employed for the preparation of ethylene copolymers which are useful in the oil composition of this invention. The ethylene and propylene used (infra) were dried individually by passing through a two foot column of molecular sieve, Type 5A. A one-liter resin flask was equipped with a stirrer, thermometer, gas inlet tube, rubber serum cap and gas outlet tube. The resin flask, stirrer, gas inlet tube and gas outlet tube were dried in an oven at 65° C. and 105 mm. pressure for at least thirty minutes before use. 0.5 liter of solvent (for example, hexane or tetrachloroethylene) which was dried over silica gel under a nitrogen atmosphere was introduced into the resin flask along with the desired amount of diolefin with one polymerizable double bond (for example, 1,4-hexadiene). The diolefin having two polymerizable double bonds was added either at the beginning of the polymerization or at a constant rate throughout the polymerization. The diolefin containing two polymerizable double bonds was passed through a short column of alumina before use and was preferably added as a solution in a solvent (for example, hexane or tetrachloroethylene). The rapidly stirred solvent was then saturated with ethylene and propylene, flowing at about 1-2 liters per minute, respectively, the feed stream being introduced below the surface of the solvent. The flow of the gases to the resin flask was left unchanged throughout the subsequent copolymerization. The ethylene and propylene were metered through separate rotameters at a back pressure of about 3 p.s.i. and were combined by passing through a three-way joint or mixing T before being introduced into the resin flask. After the solvent had been saturated with ethylene and propylene, polymerization was initiated by introducing through the serum cap by means of hypodermic syringes 5 ml. of a 1.0 molar solution of diisobutylaluminum chloride in tetrachloroethylene and 5 ml. of a 0.1 molar solution of vanadium trisacetylacetonate in benzene. The contents of the flask were kept at 25° C. by external cooling for a period of about thirty minutes, after which 10 ml. of a 1% solution of 4,4' - thiobis-(6-t-butyl-m-cresol) in isopropanol were added to terminate the polymerization. After the polymerization reaction had been terminated, the feed streams were shut off and the polymer solution was washed with 200 ml. of 5% hydrochloric acid until the organic phase was colorless. The organic layer was separated and washed twice with 200 ml. portions of water. The polymer solution was poured into a porcelain pan and the solvent was allowed to evaporate. The copolymer was dried at 60° C. and 105 mm. pressure for 24-36 hours. The yield of the copolymer was 12-20 grams. The polymerized propylene content of the copolymer was determined by infrared spectroscopy and the content of polymerized diolefin with one polymerizable double bond was determined by infrared spectroscopy or by bromine absorption. The content of the polymerized diolefin with two polymerizable double bonds was obtained by determining the amount of this diolefin which was used up in the copolymerization process (that is, amount added minus amount recovered). Inherent viscosity was determined on a 0.1 weight percent solution of the copolymer in tetrachloroethylene at 30° C. Wallace Plasticity was determined as described above.

Representative ethylene copolymers are listed in Table 1. For convenience the diolefin with one polymerizable double bond is designated Diolefin A and the diolefin with two polymerizable double bonds is designated Diolefin B. It may be seen that Table 1 includes both tetrapolymers and terpolymers, the latter being representative of prior art polymers which are useful as viscosity index improvers.

TABLE 1

| Wt. percent copolymer repeat units derived from— | | | | $\eta_{inh}$ | Wallace plasticity |
|---|---|---|---|---|---|
| Ethylene | Propylene | Diolefin A | Diolefin B | | |
| Diolefin A=1,4-hexadiene; Diolefin B=1,7-octadiene | | | | | |
| 47.8 | 49.0 | 3.2 | --- | 1.79 | 19 |
| 46.3 | 49.0 | 4.3 | 0.4 | 1.81 | 22 |
| 46.1 | 51.0 | 2.7 | 0.2 | 1.79 | 19 |
| Diolefin A=5-methylene-2-norbornene; Diolefin B=1,7-octadiene | | | | | |
| 30.7 | 69.0 | 0.3 | --- | 1.84 | 17.5 |
| 32.4 | 67.0 | 0.3 | 0.3 | 2.12 | 30 |
| Diolefin A=1,4-hexadiene; Diolefin B=norborneonorbornene | | | | | |
| 44.4 | 52.0 | 3.6 | --- | 1.68 | 19.5 |
| 42.8 | 53.0 | 3.7 | 0.5 | 1.70 | 25 |
| 44.2 | 51.0 | 3.9 | 0.9 | 1.86 | 34 |
| 46.8 | 48.0 | 3.6 | 1.6 | 1.86 | 39.5 |
| Diolefin A=1,4-hexadiene; Diolefin B=2,5-norbornadiene | | | | | |
| 50.6 | 45.6 | 3.3 | 0.5 | 1.11 | 16 |
| 50.8 | 45.6 | 3.0 | 0.6 | 1.26 | 20 |
| 50.0 | 46.0 | 3.4 | 0.6 | 1.17 | 22 |
| 50.5 | 45.5 | 3.4 | 0.6 | 1.25 | 23 |

The data in Table 1 show that by incorporating a small amount of a diolefin containing two polymerizable double bonds (Diolefin B) into an ethylene terpolymer, the amount of the other components of the terpolymer remaining substantially the same, a significant increase in the bulk polymer viscosity (Wallace Plasticity) is achieved with only a minor increase in the inherent viscosity. In Table 1, two series of comparisons can be made. In one series, when ethylene copolymers of about the same inherent viscosities are considered (1.68–2.12), those ethylene copolymers which do not contain any Diolefin B have Wallace Plasticity values of 17.5–19.5 for the viscosity range 1.68–1.84, whereas those ethylene copolymers which contain Diolefin B have Wallace Plasticity values of 19–39.5 for the viscosity range 1.70–2.12. The second series of comparisons shows that ethylene copolymers which contain a small amount of Diolefin B and have low inherent viscosities, that is, 1.11–1.26, have Wallace Plasticity values which are equal to or greater than those of ethylene copolymers which do not contain Diolefin B but which have considerably higher inherent viscosities, that is, 1.68–1.84.

Since the processability, isolation and handling of ethylene copolymers become impractical when the Wallace Plasticity values are less than about 16, the above data clearly show that the incorporation of a small amount of a diolefin with two polymerizable double bonds greatly improves the processability, isolability and ease of handling of ethylene copolymers or, expressed in another way, the incorporation of a small amount of Diolefin B provides ethylene copolymers which are processable, isolable and readily handled at inherent viscosity values considerably below those required to achieve ready processability, isolability and ease of handling in similar known ethylene copolymers.

Following is a description of another general procedure for the preparation of ethylene copolymers which are useful in the oil composition of this invention. In a reactor were placed 500 ml. of tetrachloroethylene (which had been dried over silica gel under a nitrogen atmosphere) and 3.8 ml. of 1,4-hexadiene. A combined stream of nitrogen, ethylene and propylene was introduced at flow rates of 0.5, 1 and 2 liters per minute, respectively. 2,5-norbornadiene was added and the polymerization was initiated with 7 ml. of a 1.0 molar solution of diisobutylaluminum chloride and 5 ml. of a 0.1 molar solution of vanadium trisacetylacetonate. 2,5-norbornadiene was distilled and passed through a short column of alumina before use and was introduced into the copolymerization reaction mass as a 0.052 molar solution in tetrachloroethylene. Since the amounts of polymerized ethylene, propylene and 1,4-hexadiene were about the same in all copolymers prepared, only the amount of polymerized 2,5-norbornadiene in the copolymer is given in the table.

TABLE 2

| Yield (grams) | Wt. percent copolymer repeat units derived from 2,5-norbornadiene | η ink. | Wallace plasticity |
|---|---|---|---|
| 14.3 | 0 | 1.57 | 16 |
| 14.2 | 0.166 | 1.56 | 18 |
| 14.0 | 0.34 | 1.58 | 22 |
| 14.5 | 0.67 | 1.64 | 31 |
| 15.0 | 1.29 | 1.87 | 60 |

The above data show the advantageous effect of small amounts of polymerized 2,5-norbornadiene on Wallace Plasticity and, therefore, on processability and isolability.

EXAMPLE 1

The following tests were carried out with ethylene copolymers which are useful in the oil composition of the invention. For comparison purposes, the tests were also carried out with previously described directly synthesized ethylene/propylene/1,4-hexadiene terpolymers and with ethylene/propylene/1,4-hexadiene terpolymers which had been obtained by direct synthesis and then thermally degraded to achieve the desired molecular weight. All the ethylene copolymers contained approximately the same amounts of polymerized ethylene, propylene and 1,4-hexadiene. The test data are shown in Table 3; prior art oil compositions are represented by the first eight sets of data and the useful oil composition of this invention is represented by the last five sets of data. Data also are included to show the amount of copolymer added to the base mineral oil to prepare a concentrate (1150 cs. viscosity at 210° F.) and the amount required to obtain an oil composition having a viscosity of 11.5 cs. at 210° F., the latter composition being prepared by dilution of the concentrate with mineral oil. Finally, the table includes inherent viscosity and Wallace Plasticity data for the copolymers employed in the tests.

Viscosity index was determined according to ASTM Method D-2270 by measuring the viscosities, at 100° F. and 210° F., of oil compositions containing as the base oil a solvent refined neutral oil of 107 S.U.S. at 100° and a viscosity index of 96. The amount of ethylene copolymer incorporated into the base oil was the amount required to give an oil composition of 11.5±0.1 centistoke viscosity at 210° F., which amount may be considered as a measure of its thickening effectiveness.

The apparent viscosities at 0° F. of the oil compositions containing the amount of ethylene copolymer to give a 210° F. viscosity of 11.5 centistokes were measured using a cold cranking simulator according to the procedure of ASTM Method D-2602. In this test, a sample of the oil composition was placed between a rotor and a stator maintained at 0° F. A universal motor, at constant voltage, drives the rotor which is closely fitted inside the stator. The speed of the rotor is a function of the viscosity of the oil in poises at 0° F. The results of the cold-cranking simulator method correlate well with actual engine cranking performance. In essence, the test provides a measure of the low temperature thickening of the oil composition.

All copolymer samples in Table 3 provided oil blends which gave satisfactory results in this test for 10W/30 multigrade lubricating oils.

Compatibility of the ethylene copolymers with pour point depressants was determined by measuring the pour points according to ASTM Method D-97. Pour points of oil compositions containing the amount of ethylene copolymer to provide a 210° F. viscosity of 11.5 centistokes were first determined. To each of the oil blends a representative commercial pour point depressant was added and the pour points were again determined. The representative pour point depressants used were commercially available "Paraflow" 149 and 46 (chlorinated paraffin wax-naphthalene condensation products) and "Santopour" C (condensation products of tetraparaffin-phenol). The copolymers were considered to be compatible with the pour point depressants if, on addition of the pour point depressants to the oil blends, the pour points of the oil blends were decreased; the copolymers were considered to be incompatible when the pour points of the oil blends remained the same or increased. U.S. Pat. 3,691,078 discloses that ethylene copolymers containing more than about 55 weight percent of polymerized ethylene are incompatible with common polymeric pour point depressants. Consistent therewith, all of the copolymers listed in Table 3 contain less than 55% polymerized ethylene; they have been found to be compatible with the above pour point depressants.

Shear stabilities of oil blends containing the amounts of ethylene copolymers to provide 210° F. viscosities of 11.5 centistokes, using the same base oil as in the viscosity index measurements, were determined according to the procedure of ASTM Method D-2603. The test procedure utilizes sonic degradation using a 250 watt, 10 kilocycle, magnetostrictive sonic oscillator. The test was slightly modified by shearing a 50 ml. sample for 60 minutes at 100° F. at 0.6 R.F. amps. Shear stability is expressed as the average percentage retention of viscosity in centistokes at 210° F. and 100° F. The test results are summarized in Table 3; the copolymer symbols used in the table are as follows:

E/P/HD = ethylene/propylene/1,4-hexadiene terpolymer
E/P/HD/NBD = ethylene/propylene/1,4-hexadiene/2,5-norbornadiene tetrapolymer
Percent NBD = Wt. percent of polymerized 2,5-norbornadiene in the tetrapolymer The data show that the ethylene copolymers used in the oil composition of this invention are effective viscosity index improvers and have properties which are comparable to similar prior art ethylene copolymers, which prior art ethylene copolymers have bulk polymer viscosities (Wallace Plasticity values) which are too low for achieving ready processability, isolability and ease of handling. Contrary to expectation, the copolymers which are useful herein and which have much higher Wallace Plasticity values have about the same shear stability as the prior art copolymers which have much lower Wallace Plasticity values.

TABLE 3

| Copolymer | NBD | η inh. | Wallace plasticity | Wt. percent copolymer for 1,150 cs. at 120° F. | Wt. percent copolymer for 11.5 cs. at 210° F. | Viscosity index | Shear stability (percent viscosity retention) |
|---|---|---|---|---|---|---|---|
| E/P/HD | | 2.06 | 32 | 7.2 | 1.0 | 165 | 72.4 |
| E/P/HD | | 1.55 | <16 | 9.3 | 1.27 | 170 | 81.3 |
| E/P/HD | | 1.50 | <16 | 9.8 | 1.34 | 170 | 82.4 |
| Degraded E/P/HD | | 1.06 | <16 | 14.6 | 1.91 | 168 | 91.0 |
| Degraded E/P/HD | | 1.11 | <16 | 14.0 | 1.84 | 171 | 91.4 |
| Degraded E/P/HD | | 1.13 | <16 | 13.2 | 1.73 | 170 | 88.0 |
| Degraded E/P/HD | | 1.18 | <16 | 12.9 | 1.71 | 170 | 88.4 |
| Degraded E/P/HD | | 1.22 | <16 | 12.3 | 1.66 | 169 | 88.2 |
| E/P/HD/NBD | 1.0 | 1.04 | 16 | 14.5 | 1.91 | 168 | 89.4 |
| E/P/HD/NBD | 0.45 | 1.11 | 16 | 13.5 | 1.80 | 170 | 88.8 |
| E/P/HD/NBD | 0.9 | 1.23 | | 12.0 | 1.62 | 170 | 84.6 |
| E/P/HD/NBD | 0.6 | 1.24 | 20 | 12.7 | 1.71 | 170 | 87.9 |
| E/P/HD/NBD | 0.57 | 1.25 | 23 | 12.3 | 1.62 | 170 | 81.9 |

The embodiments of the invention in which an exclusive property or privilege is claimed are defined as follows:

1. An oil composition which comprises major amounts of a neutral mineral oil base of lubricating viscosity and, as viscosity index improver, an effective amount of an essentially amorphous, oil soluble copolymer having random repeat units derived, on a weight basis with the combined weights totaling 100%, (a) 25–55% from ethylene,
(b) 37–75% from a terminally unsaturated straight chain monoolefin of 3–12 carbon atoms,
(c) 0.1–10% from a non-conjugated diolefin having 5–18 carbon atoms and only one polymerizable double bond, and
(d) 0.1–2% from a non-conjugated diolefin having 5–18 carbon atoms and two polymerizable double bonds, said copolymer having an inherent viscosity of 0.7–1.8 as measured on a 0.1 weight percent solution in tetrachloroethylene at 30° C. and a Wallace Plasticity of at least 16.

2. The oil composition of claim 1 which contains 0.5–3 weight percent of the copolymer.

3. The oil composition of claim 1 which contains 5–15 weight percent of the copolymer.

4. The oil composition of claim 1 wherein the monoolefin is propylene, the diolefin with one polymerizable double bond is 1,4-hexadiene and the diolefin with two polymerizable double bonds is 2,5-norbornadiene.

5. The oil composition of claim 1 which contains 1–2 weight percent of copolymer derived 47.3–54.7% from ethylene, 42–48% from propylene, 3–4% from 1,4-hexadiene and 0.3–0.7% from 2,5-norbornadiene, which copolymer has an inherent viscosity of 1.1–1.7.

6. The oil composition of claim 1 wherein the neutral mineral oil is a preponderantly paraffinic, solvent refined petroleum oil having an S.U.S. viscosity of 60–220 at 100° F. and a viscosity index of 80–100 or a preponderantly naphthenic solvent refined petroleum hydraulic fluid having an S.U.S. viscosity not greater than 50 at 100° F. and a pour point less than −65° F.

7. The oil composition of claim 6 wherein the neutral mineral oil is a lubricating oil having an S.U.S. viscosity of 90–160 at 100° F.

8. The oil composition of claim 6 wherein the neutral mineral oil is a transmission fluid having an S.U.S. viscosity of 60–110 at 100° F.

9. The oil composition of claim 1 wherein the monoolefin is propylene, the diolefin with one polymerizable double bond is 5-ethylidene-2-norbornene and the diolefin with two polymerizable double bonds is 2,5-norbornadiene.

10. The oil composition of claim 1 which contains 1–2 weight percent of copolymer derived 47.3–54.7% from ethylene, 42–48% from propylene, 3–4% from 5-ethylidene-2-norbornene and 0.3–0.7% from 2,5-norbornadiene, which copolymer has an inherent viscosity of 1.1–1.7.

References Cited

UNITED STATES PATENTS

| | | |
|---|---|---|
| 3,522,180 | 7/1970 | Sweeney et al. _____ 252—59 |
| 3,551,336 | 12/1970 | Jacobsson et al. _____ 252—59 |
| 3,598,738 | 8/1971 | Biswell et al. _____ 252—59 |
| 3,681,302 | 8/1972 | Sweeney _____ 252—59 |
| 3,697,429 | 10/1972 | Engel et al. _____ 252—59 |
| 3,691,078 | 9/1972 | Johnston et al. _____ 252—59 |

WARREN H. CANNON, Primary Examiner

U.S. Cl. X.R.

260—80.78

PO-1050
(5/69)

UNITED STATES PATENT OFFICE
CERTIFICATE OF CORRECTION

Patent No. 3,790,480          Dated  2/5/74

Inventor(s)  John B. Campbell and Edward Fuller Cluff and Christos Sarafidis

It is certified that error appears in the above-identified patent and that said Letters Patent are hereby corrected as shown below:

In column 12, line 2, "80-100" should be -- 80-110 --.

Signed and sealed this 9th day of April 1974.

(SEAL)
Attest:

EDWARD M. FLETCHER, JR.          C. MARSHALL DANN
Attesting Officer                Commissioner of Patents